US008995009B2

(12) United States Patent
Tanaka

(10) Patent No.: US 8,995,009 B2
(45) Date of Patent: Mar. 31, 2015

(54) IMAGE FORMING APPARATUS WITH FLUORESCENT COLOR RECORDING PORTION

(71) Applicant: KYOCERA Document Solutions Inc., Osaka-shi, Osaka (JP)

(72) Inventor: Kazunori Tanaka, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/073,770

(22) Filed: Nov. 6, 2013

(65) Prior Publication Data
US 2014/0132969 A1 May 15, 2014

(30) Foreign Application Priority Data
Nov. 13, 2012 (JP) .................................. 2012-249411

(51) Int. Cl.
*H04N 1/54* (2006.01)
*H04N 1/60* (2006.01)
(52) U.S. Cl.
CPC ............... *H04N 1/54* (2013.01); *H04N 1/6033* (2013.01)
USPC .............. 358/1.6; 358/1.9; 358/504; 358/518
(58) Field of Classification Search
CPC ............ H04N 1/46; H04N 1/54; H04N 1/60; H04N 1/6033; H04N 1/6058; H04N 1/6088
USPC ........... 358/1.1, 1.6, 1.9, 500, 501, 504, 518, 358/523
See application file for complete search history.

(56) References Cited

U.S. PATENT DOCUMENTS

| 5,563,724 A * | 10/1996 | Boll et al. ..................... 358/502 |
| 2012/0120424 A1 * | 5/2012 | Hirano ........................... 358/1.9 |

FOREIGN PATENT DOCUMENTS

| JP | 09098302 A | 4/1997 |
| JP | 2004242106 A | 8/2004 |

* cited by examiner

*Primary Examiner* — Thomas D Lee
(74) *Attorney, Agent, or Firm* — Alleman Hall McCoy Russell & Tuttle LLP

(57) ABSTRACT

A color conversion portion generates, when fluorescent color is not included in an image of document sheet, image data according to color coordinate system of a printing device for image of the document sheet, in predetermined color conversion mode, based on image data of read image, and, when a fluorescent color is included in an image of a document sheet, generates, for colors other than the fluorescent color, image data according to the color coordinate system of a printing device for the image of the document sheet, in the predetermined color conversion mode, based on image data of a read image, and generates, for the fluorescent color, image data according to the color coordinate system of the printing device for the image of the document sheet, based on the image data of the read image, by using a color value of a color patch corresponding to the recorded fluorescent color.

6 Claims, 5 Drawing Sheets

IMAGE FORMING APPARATUS WITH FLUORESCENT COLOR RECORDING PORTION

INCORPORATION BY REFERENCE

This application is based upon and claims the benefit of priority from the corresponding Japanese Patent Application No. 2012-249411 filed on Nov. 13, 2012, the entire contents of which are incorporated herein by reference.

BACKGROUND

The present disclosure relates to image forming apparatuses.

In some cases, a fluorescent color is included in a document sheet for which color copying is performed by a color digital multifunction peripheral. The fluorescent color is, for example, a color applied over a character or the like on a paper sheet surface by using a fluorescent pen or the like.

A color of a region, in a document sheet, having a normal color applied thereon is determined based on only light obtained by applied light being reflected, whereas a color of a region having a fluorescent color applied thereon is determined based on fluorescence emitted from itself, in addition to the reflected light. Therefore, when a document sheet on which a fluorescent color is applied by a fluorescent pen is read by a scanner, a value obtained by reading a region having the fluorescent color applied thereon indicates a value which is not obtained in a region having a normal color applied thereon. In this case, the original color is not reproduced at all, or the original color is reproduced as a color different from the color in the document sheet.

Furthermore, even if copying and output of a color of a fluorescent pen having been read are attempted, the color of the fluorescent pen cannot be reproduced by using standard coloring materials in the multifunction peripheral. Therefore, a problem may arise that a printed object is greatly different, in visual impression, from an original document sheet. In order to address this, in related arts, whether or not a fluorescent color is included in an image is determined based on input image data for each pixel, and color conversion process is performed for a portion determined to include the fluorescent color, thereby improving reproducibility for the fluorescent pen.

SUMMARY

An image forming apparatus according to one aspect of the present disclosure includes: an image reading device; a printing device; a fluorescent color recording portion; and a color conversion portion. The image reading device reads an image of a record sheet including a region of a fluorescent color applied by a fluorescent pen, reads an image of a document sheet, and generates image data of the read images. The fluorescent color recording portion reads a color value of the fluorescent color in the record sheet, and causes the printing device to print a group of neighboring color patches that includes a plurality of color patches representing the read color value and color values near the read color value. Further, the fluorescent color recording portion identifies a color patch selected by a user from among the group of neighboring color patches having been printed, and records a color value of the color patch in a color coordinate system of the printing device, and the color value of the fluorescent color so as to be associated with each other. The color conversion portion generates, when the fluorescent color is not included in the image of the document sheet, image data according to the color coordinate system of the printing device for the image of the document sheet, in a predetermined color conversion mode, based on the image data of the read image. Further, when the fluorescent color is included in the image of the document sheet, the color conversion portion generates, for colors other than the fluorescent color, image data according to the color coordinate system of the printing device for the image of the document sheet, in the predetermined color conversion mode, based on the image data of the read image, and generates, for the fluorescent color, image data according to the color coordinate system of the printing device for the image of the document sheet, based on the image data of the read image, by using the color value of the color patch corresponding to the recorded fluorescent color.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
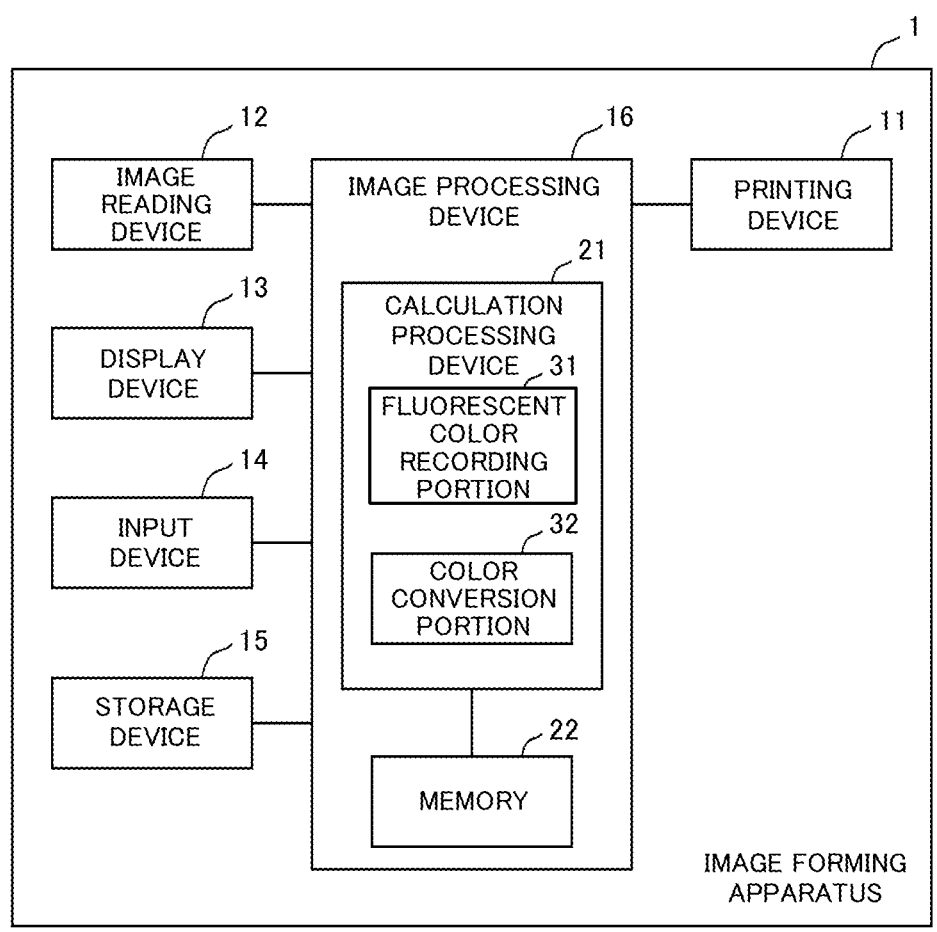
FIG. 1 is a block diagram illustrating a configuration of an image forming apparatus according to an embodiment of the present disclosure.

An image forming apparatus 1 shown in FIG. 1 is a copy machine. However, the image forming apparatus 1 may be a multifunction peripheral or the like.

The image forming apparatus 1 includes a printing device 11, an image reading device 12, a display device 13, an input device 14, a storage device 15, and an image processing device 16.

The printing device 11 is an internal device that prints a document sheet image based on image data. The printing device 11 prints the document sheet image based on, for example, image data obtained by a fluorescent color portion of the document sheet image being subjected to color conversion by the image processing device 16.

The image reading device 12 is an internal device that optically reads a document sheet image from a document sheet, and generates image data of the document sheet image.

Furthermore, the image reading device 12 reads an image, on a record sheet, including a fluorescent color applied by a fluorescent pen of a user, and generates image data of the read image.

The display device 13 is, for example, a liquid crystal display mounted to a casing. The display device 13 displays various information or messages. The input device 14 is implemented as a touch panel, a hardware key, or the like. The input device 14 receives a user's operation, and outputs an electrical signal corresponding to the user's operation.

The storage device 15 is a rewritable non-volatile storage device such as a flash memory, and stores various data.

The image processing device 16 performs image processing, such as color conversion for a fluorescent color portion, on image data generated by the image reading device 12 or the like.

The image processing device 16 includes a calculation processing device 21 and a memory 22. The calculation processing device 21 is implemented as an application specific integrated circuit (ASIC), a microcomputer, or the like, and includes various processing portions. The memory 22 is a rewritable storage device such as a random access memory (RAM). In the memory 22, image data that has yet to be subjected to image processing, data being subjected to image processing, image data that has been subjected to image processing, and the like are temporarily stored.

In the calculation processing device 21, a fluorescent color recording portion and a color conversion portion 32 are included and implemented as processing portions.

The fluorescent color recording portion 31 (a) reads a color value of a fluorescent color in the record sheet described above, and (b) causes the printing device 11 to print a group of neighboring color patches that includes a plurality of color patches representing the read color value and color values near the read color value. The fluorescent color recording portion 31 (c) identifies a color patch, among the group of neighboring color patches having been printed, which is selected by a user according to the user performing an operation on the input device 14, and (d) records the color value of the fluorescent color, and a color value of the selected color patch in a color coordinate system of the printing device 11, so as to be associated with each other. At this time, the color value of the fluorescent color and the color value of the selected color patch are associated with each other and stored as color conversion data in the storage device 15.

The color conversion portion 32 determines whether or not a fluorescent color recorded as the color conversion data by the fluorescent color recording portion 31 is included in an image of a document sheet read by the image reading device 12.

When it is determined that the fluorescent color as recorded is not included in the image of the document sheet, the color conversion portion 32 generates image data according to a color coordinate system (in the description herein, a CMYK color coordinate system) of the printing device 11 for the image of the document sheet, in a predetermined color conversion mode, based on image data of the read image. The predetermined color conversion mode is, for example, a default color conversion mode according to a predetermined look-up table, a predetermined conversion expression, or the like. On the other hand, when it is determined that the fluorescent color as recorded is included in the image of the document sheet, the color conversion portion 32 generates, for colors other than the fluorescent color, image data according to the color coordinate system of the printing device 11 for the image of the document sheet, in the predetermined color conversion mode described above, based on image data of the read image, and the color conversion portion 32 generates, for the fluorescent color, image data according to the color coordinate system of the printing device 11 for the image of the document sheet, based on image data of the read image, by using the color value of the color patch corresponding to the recorded fluorescent color.

In the present embodiment, the color coordinate system of the printing device is a CMYK coordinate system, and the fluorescent color recording portion 31 converts a color value of a fluorescent color having been read, to an L*a*b* value in another color coordinate system, and converts a group of neighboring color patches that includes a plurality of color patches representing the L*a*b* value and L*a*b* values near the L*a*b* value, so as to meet the color coordinate system of the printing device 11, and then causes the printing device 11 to print the obtained group of neighboring color patches, and records a CMYK value of a color patch selected by a user and the L*a*b* value of the fluorescent color so as to be associated with each other.

Furthermore, in the present embodiment, when a difference between an L*a*b* value of a color in an image of a document sheet and an L*a*b* value of a fluorescent color having been recorded (that is, each of a difference in the L* value, a difference in the a* value, and a difference in the b* value) is less than a predetermined threshold value, the color conversion portion 32 determines that the fluorescent color is included in the image of the document sheet.

For example, in a case where an L*a*b* value of a fluorescent color having been recorded represents (90, −10, 60), and a threshold value (absolute value) is five, when a document sheet image includes a color in which an L* value is greater than 85 and less than 95, an a* value is greater than −15 and less than −5, and a b* value is greater than 55 and less than 65, it is determined that the fluorescent color having the L*a*b* value of (90, −10, 60) is included.

Furthermore, only when a predetermined fluorescent pen mode is designated by a user, the color conversion portion 32 uses, for a fluorescent color in an image of a document sheet, a color value of a color patch corresponding to the recorded fluorescent color, to generate image data according to the color coordinate system of the printing device 11 for the image of the document sheet, based on image data of the read image.

In the present embodiment, the color patch described above may be an image that has a color region having a predetermined shape and that is superimposed on a predetermined character image. Thus, a user is allowed to select a color patch based on an impression obtained when the fluorescent color is applied over a character by the fluorescent pen, thereby allowing the user to select a more desirable color patch. Furthermore, the predetermined character image may be printed on the record sheet, and a fluorescent color may be applied, by a user, over the predetermined character image on the record sheet. Thus, a user is allowed to compare the fluorescent color applied over the character image in the record sheet, with fluorescent colors on the character images in the color patches, thereby allowing the user to select a more desirable color patch.

Next, an operation of the image forming apparatus will be described. In the description herein, a fluorescent color recording process in which a fluorescent color of a fluorescent pen of a user is recorded, and an output process such as copying will be described.

(1) Fluorescent Color Recording Process

Figure 2:
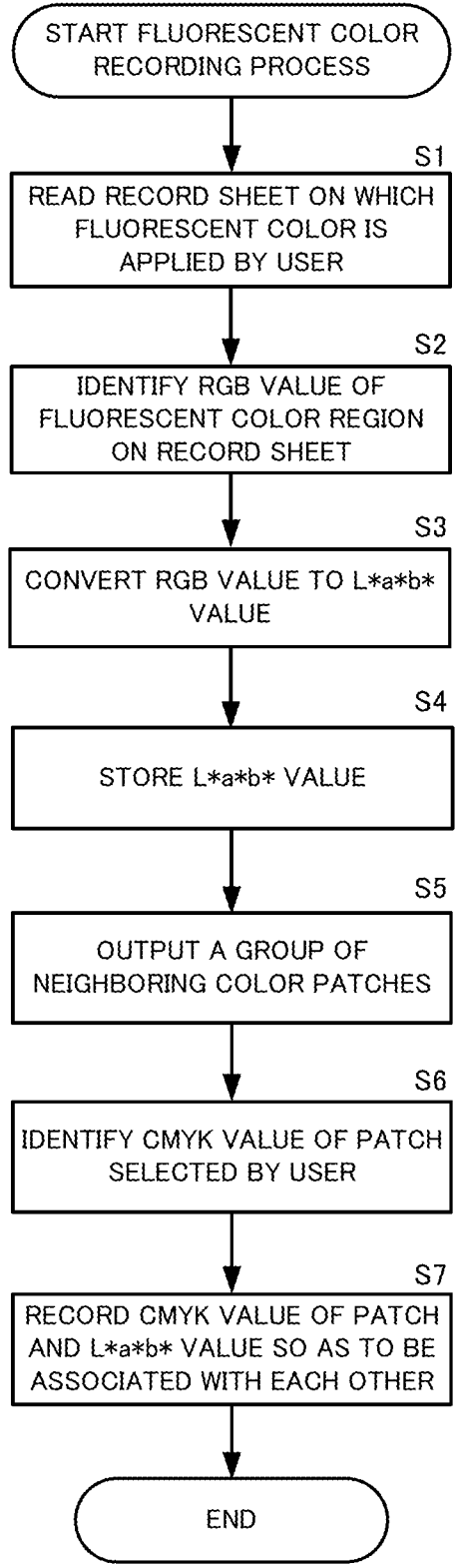
FIG. 2 is a flow chart showing a fluorescent color recording process performed by the image forming apparatus shown in FIG. 1.

FIG. 2 is a flow chart showing the fluorescent color recording process performed by the image forming apparatus shown in FIG. 1.

Figure 3A:
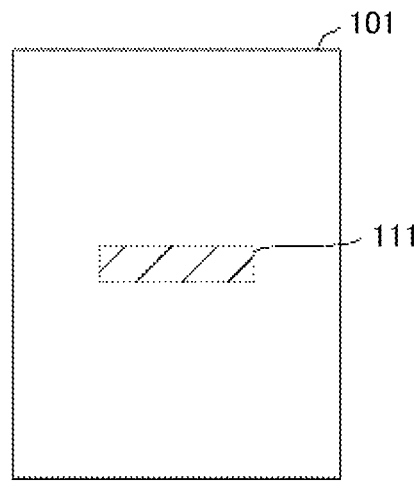
FIG. 3A and FIG. 3B illustrate examples in which fluorescent colors are applied on record sheets.
Figure 3B:
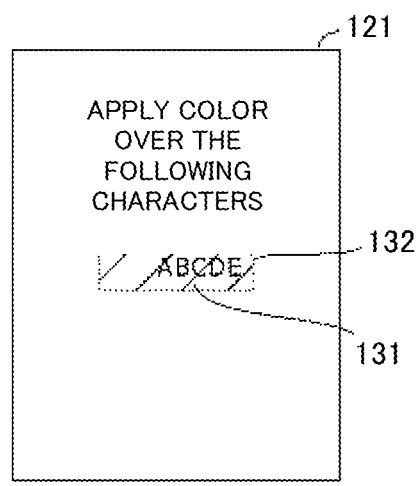

A user applies a fluorescent color on the record sheet by using a fluorescent pen of the user, and thereafter places the record sheet on the image forming apparatus 1. The user performs a predetermined operation on the input device 14, to cause the image forming apparatus 1 to start the fluorescent color recording process. FIG. 3A and FIG. 3B illustrate examples in which fluorescent colors are applied on record sheets. As shown in FIG. 3A, a fluorescent color is applied on a record sheet 101, thereby forming a fluorescent color region 111. The record sheet is usually a white paper sheet. Furthermore, as shown in FIG. 3B, a character image 131 may be printed on a record sheet 121 in advance, and a fluorescent color may be applied over the character image 131 by a user. In this case, a fluorescent color region 132 that includes the character image 131 is formed.

In the fluorescent color recording process, the fluorescent color recording portion 31 firstly controls the image reading device 12 so as to read an image on the record sheet, thereby obtaining RGB data of the image on the record sheet (step S1). The fluorescent color recording portion 31 identifies an RGB value of the fluorescent color region 111 or 132, based on the RGB data (for the region 132, an RGB value for a portion other than the character image 131) (step S2).

Next, the fluorescent color recording portion 31 converts the RGB value to an L*a*b* value (step S3), and stores the L*a*b* value in the memory 22 or the storage device 15 (step S4).

Furthermore, the fluorescent color recording portion 31 generates an image of a group of neighboring color patches for the L*a*b* value. At this time, the fluorescent color recording portion 31 changes the L*a*b* value in a saturation, brightness, and hue at regular intervals, to determine color values (L*a*b* values) of color patches in the group of neighboring color patches. The fluorescent color recording portion 31 determines a CMYK value corresponding to a color value of each patch, generates an image of the group of neighboring color patches as CMYK data, and causes the printing device 11 to print the image of the group of neighboring color patches, based on the CMYK data (step S5).

Figure 4A:
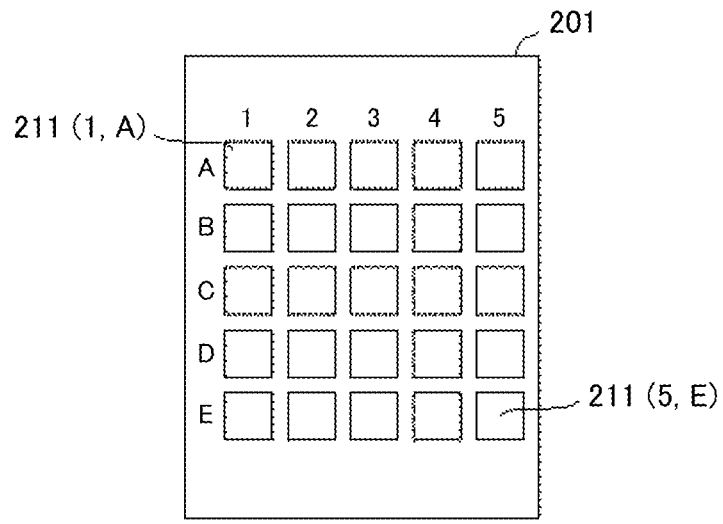
FIG. 4A and FIG. 4B illustrate an example of a group of neighboring color patches printed by the image forming apparatus shown in FIG. 1.
Figure 4B:
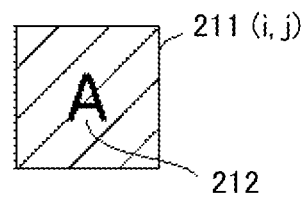

FIG. 4A and FIG. 4B illustrate an example of a group of neighboring color patches printed by the image forming apparatus shown in FIG. 1. As shown in FIG. 4A, color patches 211 (i, j) that are two-dimensionally arrayed are printed together with column numbers (1, 2, 3, 4, 5) and line characters (A, B, C, D, E), on a print paper sheet 201 having the same color as a base color of the record sheet 101 or 121. Each color patch 211 (i, j) represents a rectangular region that is printed solid in one color.

As shown in FIG. 4B, a character image 212 representing a portion or the entirety of the character image 131 printed on the record sheet (FIG. 3B) may be included in each color patch 211 (i, j).

A user compares the print paper sheet 201 having the group of neighboring color patches printed thereon, with the record sheet 101 or 121 on which the fluorescent color is applied, and performs an operation on the input device 14 so as to select a color patch that is determined, by the user, to be closest to the fluorescent color, from among the group of neighboring color patches. For example, the user inputs the column number and the line character of a color patch to select the color patch. For example, when the user inputs the column number [4] and the line character [C], the color patch 211 (4, C) is selected. The fluorescent color recording portion 31 identifies the color patch selected by the user, based on the information inputted to the input device 14, to identify a CMYK value of the color patch (step S6).

The fluorescent color recording portion 31 stores the identified CMYK value and the L*a*b* value of the fluorescent color obtained from the record sheet, as the color conversion data, in the storage device 15, so as to be associated with each other (step S7).

Thus, the fluorescent color of the fluorescent pen of the user, and the CMYK value of a standard color that corresponds to the fluorescent color, and that is selected by the user as his/her desired color (that is, a color based on coloring materials in the image forming apparatus 1) are associated with each other and recorded.

(2) Output Process

Figure 5:
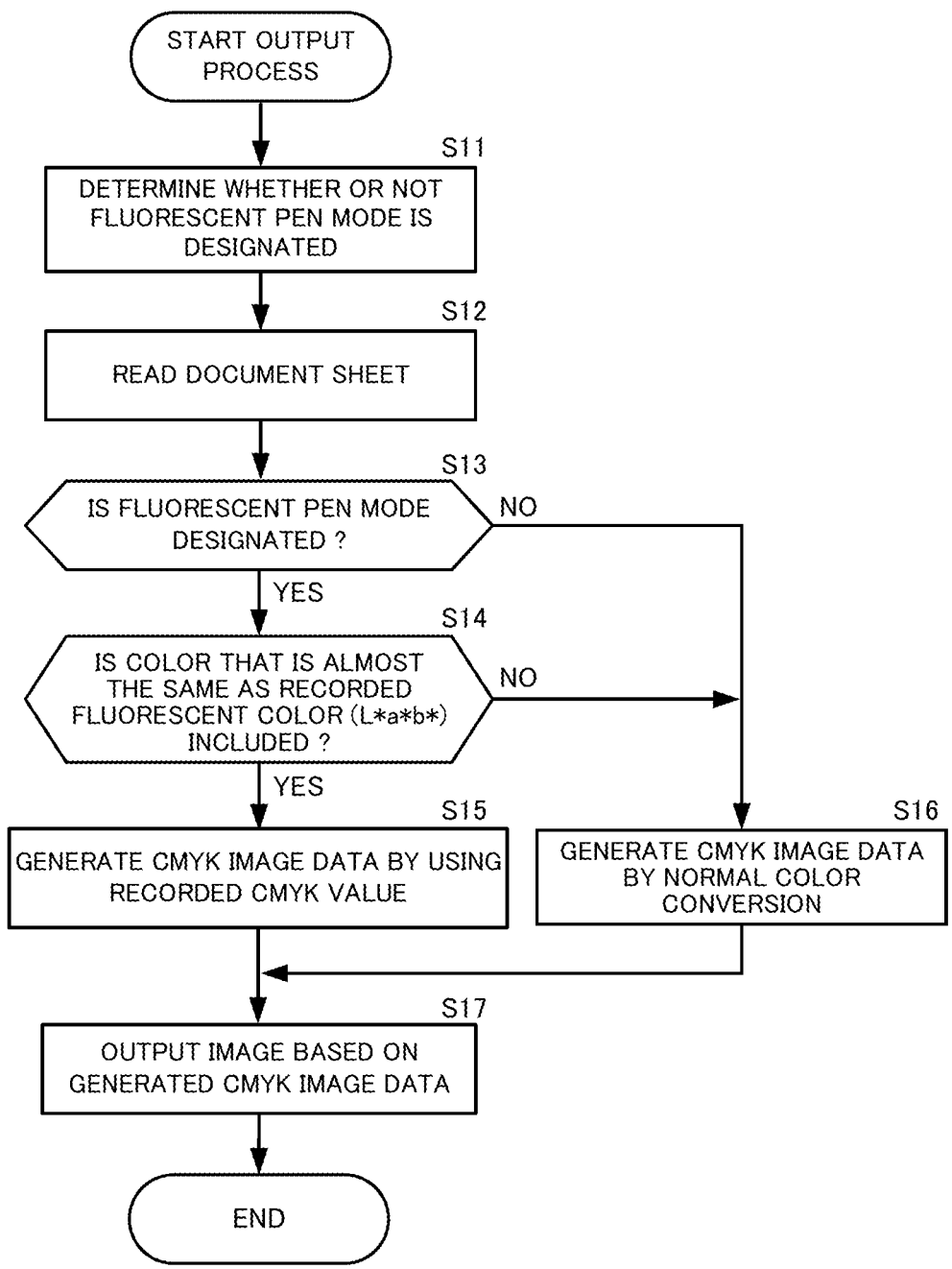
FIG. 5 is a flow chart showing an output process performed by the image forming apparatus shown in FIG. 1.

FIG. 5 is a flow chart showing the output process performed by the image forming apparatus shown in FIG. 1.

When the output process such as copying is performed, a user places a document sheet to be copied, on the image forming apparatus 1. The user performs a predetermined operation on the input device 14, and causes the image forming apparatus 1 to start the output process. At this time, the user is allowed to designate the fluorescent pen mode by performing a predetermined operation on the input device 14.

In the output process, the color conversion portion 32 determines whether or not the fluorescent pen mode is designated by a user (step S11).

When the image reading device 12 generates RGB data of a document sheet image (step S12), the color conversion portion 32 determines whether or not the fluorescent pen mode is designated by the user (step S13). When it is determined that the fluorescent pen mode is designated by the user, the color conversion portion 32 determines whether or not a color that is almost the same as a fluorescent color (L*a*b* value) recorded for the user as the color conversion data is included in the document sheet image (that is, whether or not a color in which a difference (absolute value) from the recorded L*a*b* value is less than the threshold value as described above is included) (step S14).

When a color that is almost the same as a fluorescent color (L*a*b* value) recorded for the user as the color conversion data is included in the document sheet image, the color conversion portion 32 converts the color in the document sheet image to the CMYK value associated with the fluorescent color in the color conversion data, and performs color conversion for the other colors in a predetermined color conversion mode, to generate CMYK data of the document sheet image (step S15).

On the other hand, when a color that is almost the same as a fluorescent color (L*a*b* value) recorded for the user as the color conversion data is not included in the document sheet image (step S14), or when the fluorescent pen mode is not designated (step S13), the color conversion portion 32 performs the color conversion for all the colors in the document sheet image in the predetermined color conversion mode, to generate CMYK data of the document sheet image (step S16).

The color conversion portion 32 causes the printing device 11 to print an image based on the generated CMYK data of the document sheet image (step S17).

Thus, in a case where the fluorescent pen mode is designated, when a fluorescent color of a fluorescent pen of a user is included in the document sheet image, the fluorescent color is converted to a standard color that is previously recorded as a color desired by the user.

As described above, in the above embodiment, the fluorescent color recording portion 31 (a) reads a color value of a fluorescent color in the record sheet, and (b) causes the printing device 11 to print a group of neighboring color patches that includes a plurality of color patches representing the read color value and color values near the read color value. The fluorescent color recording portion 31 (c) identifies a color patch, among the group of neighboring color patches having been printed, which is selected by a user according to the user performing an operation on the input device 14, and (d) records the color value of the fluorescent color, and a color value of the selected color patch in a color coordinate system of the printing device 11, so as to be associated with each other. Furthermore, when it is determined that the fluorescent color as recorded is not included in an image of a document sheet, the color conversion portion 32 generates image data according to the color coordinate system of the printing device 11 for the image of the document sheet, in a predetermined color conversion mode, based on image data of a read image. On the other hand, when it is determined that the fluorescent color as recorded is included in an image of a document sheet, the color conversion portion 32 generates, for colors other than the fluorescent color, image data according to the color coordinate system of the printing device 11 for the image of the document sheet, in the predetermined color conversion mode described above, based on image data of the read image, and the color conversion portion 32 generates, for the fluorescent color, image data according to the color coordinate system of the printing device 11 for the image of the document sheet, based on image data of the read image, by using a color value of a color patch corresponding to the recorded fluorescent color.

Thus, in a printed sheet such as a copied sheet, or the like, a fluorescent color in a document sheet is reproduced with a standard color that is desired by a user.

On the other hand, in related arts, even when a fluorescent color is converted, a color of a fluorescent pen in a document sheet cannot be accurately reproduced, and a user may be unsatisfied with color reproduction of the fluorescent color on a printed sheet or the like since a desirable reproduced color is different for each user. For example, a case is assumed in which an orange-based fluorescent color is reproduced. Standard orange-based colors include various colors such as a yellowish orange color and a reddish orange color. Therefore, a color may not be printed as desired by a user.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   an image reading device that reads an image of a record sheet including a region of a fluorescent color applied by a fluorescent pen, reads an image of a document sheet, and generates image data of the read images;
   a printing device;
   a fluorescent color recording portion that reads a color value of the fluorescent color in the record sheet, causes the printing device to print a group of neighboring color patches that includes a plurality of color patches representing the read color value and color values neighboring the read color value, identifies a color patch selected by a user from among the group of neighboring color patches having been printed, and records a color value of the color patch in a color coordinate system of the printing device, and the color value of the fluorescent color so as to be associated with each other; and
   a color conversion portion that generates, when the fluorescent color is not included in the image of the document sheet, image data according to the color coordinate system of the printing device for the image of the document sheet, in a predetermined color conversion mode, based on the image data of the read image, and, when the fluorescent color is included in the image of the document sheet, generates, for colors other than the fluorescent color, image data according to the color coordinate system of the printing device for the image of the document sheet, in the predetermined color conversion mode, based on the image data of the read image, and generates, for the fluorescent color, image data according to the color coordinate system of the printing device for the image of the document sheet, based on the image data of the read image, by using the color value of the color patch corresponding to the recorded fluorescent color.

2. The image forming apparatus according to claim 1, wherein
   the color coordinate system of the printing device is a CMYK coordinate system, and
   the fluorescent color recording portion converts the color value of the fluorescent color to an $L^*a^*b^*$ value, converts a group of neighboring color patches that includes a plurality of color patches representing the $L^*a^*b^*$ value and color values neighboring the $L^*a^*b^*$ value so as to meet the color coordinate system of the printing device, causes the printing device to print the group of neighboring color patches obtained by the conversion, and records a value of a selected color patch in the color coordinate system of the printing device, and the $L^*a^*b^*$ value of the fluorescent color so as to be associated with each other.

3. The image forming apparatus according to claim 2, wherein the color conversion portion determines that the fluorescent color is included in the image of the document sheet when a difference between an $L^*a^*b^*$ value of a color in the image of the document sheet, and the $L^*a^*b^*$ value of the recorded fluorescent color is less than a predetermined threshold value.

4. The image forming apparatus according to claim 1, wherein the color patch represents an image that has a color region having a predetermined shape and that includes a predetermined character image.

5. The image forming apparatus according to claim 4, wherein the predetermined character image is printed on the record sheet, and the fluorescent color is applied over the predetermined character image on the record sheet.

6. The image forming apparatus according to claim 1, wherein, only when a predetermined fluorescent pen mode is designated by a user, the color conversion portion generates, for the fluorescent color in the image of the document sheet, image data according to the color coordinate system of the printing device for the image of the document sheet, based on the image data of the read image, by using the color value of the color patch corresponding to the recorded fluorescent color.

* * * * *